Nov. 7, 1967  W. C. FEESER  3,351,892
POLARIZED PATCHCORD
Original Filed May 12, 1964  2 Sheets-Sheet 1

INVENTOR.
WILLIAM COOVER FEESER
BY

Nov. 7, 1967 W. C. FEESER 3,351,892
POLARIZED PATCHCORD
Original Filed May 12, 1964 2 Sheets-Sheet 2

INVENTOR.
WILLIAM COOVER FEESER

United States Patent Office 3,351,892
Patented Nov. 7, 1967

3,351,892
POLARIZED PATCHCORD
William Coover Feeser, New Cumberland, Pa., assignor to AMP Incorporated, Harrisburg, Pa.
Continuation of application Ser. No. 366,734, May 12, 1964. This application Feb. 6, 1967, Ser. No. 614,364
7 Claims. (Cl. 339—184)

This application is a continuation of my application Ser. No. 366,734, filed May 12, 1964, and now abandoned.

This invention relates to plug contactors of the patchcord type and more particularly to polarized plug contactors.

It becomes necessary at times to provide polarization with regard to patchcords. This is especially true when the polarized part of the patchcord is to engage a specific contact, such as, for example, a common lead, used for a specific purpose or assure proper insertion within the correct apertures. Various types of polarization concepts have been utilized among which are: a projection or projections on the patchcord body portion mating with complementary recesses in the aperture or vice versa, the polarized part is larger or smaller than the other part or parts of the patchcord or other similar arrangements.

To provide patchcords with polarizing means in the above-described manner would be costly since the molding and forming operations would be more complex and to make the polarized part larger or smaller would entail making at least two pieces of different sizes.

It is, therefore, an object of the present invention to provide existing patchcords with polarizing means.

It is another object of the present invention to provide polarizing means for patchcords that are simple and economical.

A further object of the present invention is the provision of polarizing means capable of being removably mounted on patchcords.

An additional object of the present invention is the provision of polarizing means for use on patchcords having two or more contact parts.

Other objects and attainments of the present invention will become apparent to those skilled in the art upon a reading of the following detailed description when taken in conjunction with the drawings in which there are shown and described illustrative embodiments of the invention; it is to be understood, however, that these embodiments are not intended to be exhaustive nor limiting of the invention but are given for purposes of illustration and principles thereof and the manner of applying them in practical use so that they may modify them in various forms, each as may be best suited to the conditions of a particular use.

In the drawings:

FIGURES 3–7 are views of several embodiments of patchcords for use in accordance with the present invention.

The present invention will be described in connection with the patchcord plug completely described in U.S. Patent 3,134,633 and assigned to the same assignee; however, it is to be understood that the present invention is equally applicable to any other similar type of patchcord.

Figure 1:
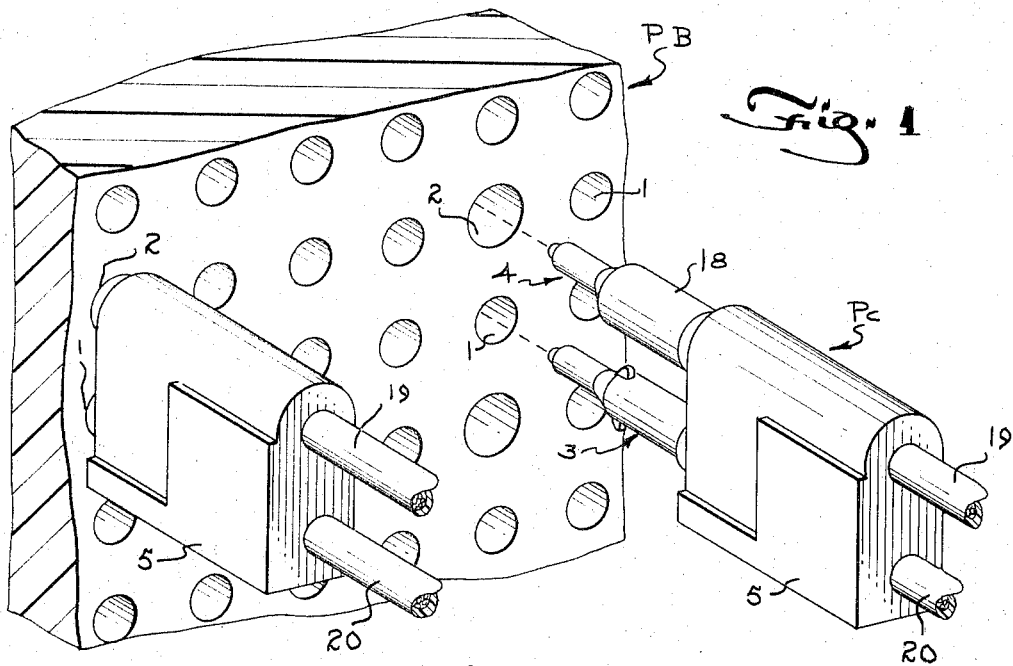
FIGURE 1 is a perspective, part sectional and partially exploded view of a plugboard and patchcord assembly.
Figure 2:
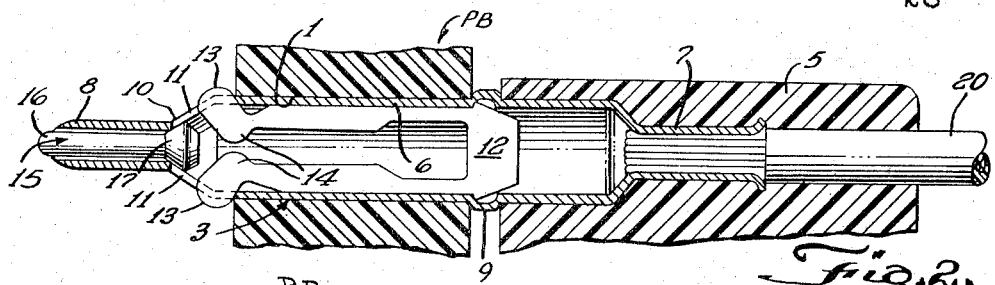
FIGURE 2 is a longitudinal cross-sectional view of a non-polarized plug part of a patchcord within an aperture of the plugboard.

As shown in FIGURE 1, a plugboard PB includes small apertures 1 and large polarizing apertures 2 which may be arranged in any desired configuration. In general, the contact in alignment with large apertures 2 will be a common circuit, such as, ground. Patchcord PC comprises plug members 3 and 4 disposed in an insulating boot 5 which is generally of any suitable plastic material.

Each plug member comprises a metallic sleeve 6 including a wire barrel section 7 and a nose section 8. A circumferential ridge 9 is provided on sleeve 6 and this serves as a stop to limit the inner movement of the plug member within a corresponding aperture of the plugboard.

As can be discerned, nose section 8 is coaxial with sleeve 6 and is of less diameter than this sleeve as well as being joined thereto via frustoconical section 10. Diametrical slots 11 are disposed in frustoconical section 10 and extend a short distance into sleeve 6.

A U-shaped spring 12 is disposed within sleeve 6 and includes a latch section 13 at each free end of spring 12 which protrudes in a normal manner through a respective slot 11 and slightly beyond the exterior surface of sleeve 6. An inner end 14 of one latch section 13 bends away from an inner end 14 of the other latch section so that when the legs of spring 12 are pressed toward each other by pressure being applied to latch sections 13, ends 14 pass beyond and adjacent one another. As can be discerned, the surface of each latch section facing nose section 8 is inclined from inner end 14 toward slot 11, and the part of latch section 13 that protrudes from its slot beyond the exterior surface of sleeve 6 while facing ridge 9 has a rounded surface which then becomes linear and inclined as it extends within sleeve 6.

Spring 12 is free to move within and relative to sleeve 6 in an axial direction, and axial movement thereof is limited by the length of slots 11. Spring 12 may, however, be secured within sleeve 6 in any suitable manner, such as, for example, spring 12 having projections which engage the circumferential groove of ridge 9. Also, instead of two latch sections, spring 12 could be provided with one latch section and, of course, this would necessitate only one slot in sleeve 6. Moreover, if desired, spring 12 may be provided with more than two latch sections.

A nose or locking member 15 is disposed partly in nose section 8 and partly in section 10 and is freely movable therein. Nose member 15 includes a stem 16 and an engaging section 17. Stem 16 has a diameter slightly less than nose section 8 and a length in excess thereof. Engaging section 17 has a first frustoconical portion of similar inclination as that of the inner surface of section 10 and a second frustoconical portion. The bases of these frustoconical portions are connected together and the smaller part of the first frustoconical portion is connected to the inner end of stem 16 while the smaller part of the second frustoconical portion extends toward the inclined surfaces of latch sections 13.

The first frustoconical portion of engaging section 17 limits the outer movement of nose member 15 by engagement with the inner surface of section 10 and allows stem 16 to extend a short distance beyond the free end of nose section 8. The second frustoconical portion of engaging section 17 engages the adjacent inclined surfaces of latch sections 13 when force is applied to the outer end of stem 16 to move nose member 15 relative to nose section 8. When the force on stem 16 is larger than the tension of spring 12, the second frustoconical portion forces latch sections 13 away from the longitudinal axis of the plug member via a wedging or camming action. This prevents the latch sections from moving toward the longitudinal axis, and when the plug member is in an aperture in the plugboard, the latch sections engage the area of the plugboard adjacent the aperture thereby preventing the plug member from being pushed out of this aperture.

If no force is applied to the outer end of stem 16 and spring 12 is not axially movable within sleeve 6, an operator can readily remove the plug member from the plugboard by grasping boot 5 or conductor means 19 and exerting pressure in an outward direction from the plugboard. This causes a camming action to occur between latch sections 13 and the edge of the aperture causing the latch sections to move toward the longitudinal axis of the plug member so that the outermost points of the latch sections are even with the outer surface of sleeve 6 to allow the plug member to be removed from the plugboard.

Upon insertion of the plug member within an aperture of the plugboard, similar camming action occurs when the latch sections engage the edge of the aperture and after the plug member has been fully inserted within the aperture, the latch sections move to their normal position to hold the plug member within the aperture since the distance between ridge 9 and latch sections 13 conform to the thickness of plugboard PB. In adidtion, the inclined surfaces of the latch sections provide a positive pressure between them and ridge 9 to enable the plug member to be snugly held within the aperture. Moreover, the rounded surfaces of the latch sections extending beyond the exterior surface of section 10 and sleeve 6 facilitate the camming action during the removal and insertion of the plug member. The outer end of stem 16 is also rounded to eliminate any sharp edges which could score a contact member against which the stem engages.

With regard to the embodiment of the plug member having the axially movable spring, this plug member operates in the same manner as that of the above-described plug member except that once the plug member has been inserted within an aperture of the plugboard, the plug member moves within the aperture a distance defined by slots 11 and is permanently disposed therein due to the inclined surfaces of the latch sections engaging the second frustoconical portion of the engaging section. The plug member remains in the aperture until the latch sections are moved toward each other by means of some tool or in any other suitable manner. Thus, this type of plug member is appropriately defined as a semipermanent plug member.

While it has been disclosed that nose member 15 is disposed in sections 8 and 10, it should be pointed out that in the semipermanent plug member, this nose member could be eliminated since the inclined surfaces of the latching sections could engage the forward ends of slots 11 which would cam the latching section away from the longitudinal axis of the plug member upon the application of continuous and increased force being applied to the nose section or boot. This defines a positive locking means.

The semipermanent plug member is suitable to perform the main object of the invention. A tubular member 18 is fitted onto plug member 4 and has a length about equal to the length between ridge 9 and latch sections 13, an inside diameter slightly in excess of the outside diameter of sleeve 6 and an outside diameter slightly less than the diameter of polarizing apertures 2. Thus, all of the plug members are the same size and tubular member 18 readily fits on any one of them, except that, it is desirable that one of the plug members of a multiple patchcord be semipermanent and this be the one on which the tubular member is placed because it will remain thereon until the latch sections are depressed toward each other. Tubular member 18 may, therefore, be removed to allow the plug member to be used in apertures 1.

As can be discerned, polarizing apertures 2 and the plug member of a patchcord assembly containing tubular member 18 thereon define a polarizing means to ensure proper insertion of the patchcord in the plugboard. The leading end of tubular member 18 is inclined to facilitate insertion in the polarizing aperture; however, both ends may be inclined.

The patchcords shown in FIGURE 1 have conductor means 19 and 20 extending outwardly from boot 5. Each of the conductor means has the wire core thereof preferably crimped within wire barrel section 7 of the plug member, and, as shown, conductor means 19 is interconnected between plug members 4 of the patchcords while conductor means 20 is interconnected between plug members 3.

Figure 3:
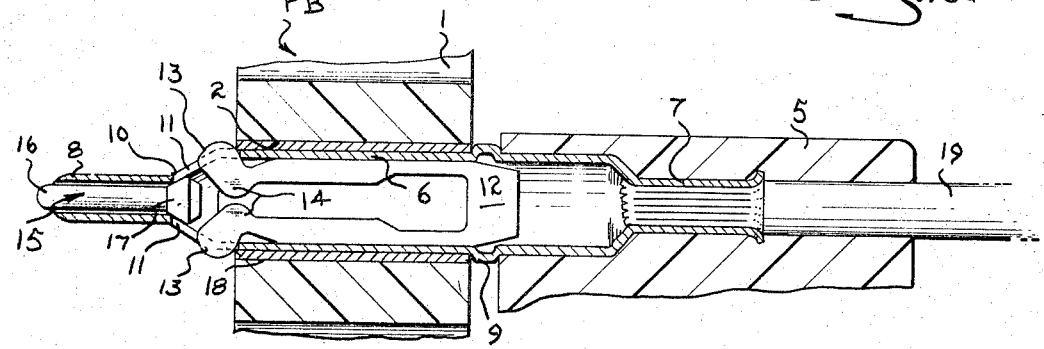
FIGURE 3 is a longitudinal cross-sectional view of the polarizing plug part of the patchcord within an aperture of the plugboard.

FIGURE 3 illustrates a patchcord PC which has polarizing plug member 4a interconnected with plug member 3a via lead 21 and boot 5a encompassing this lead. The embodiment of FIGURE 3 is primarily for shunt purposes. Boot 5a includes ridges 22 which aid an operator to grasp the patchcord.

Figure 4:
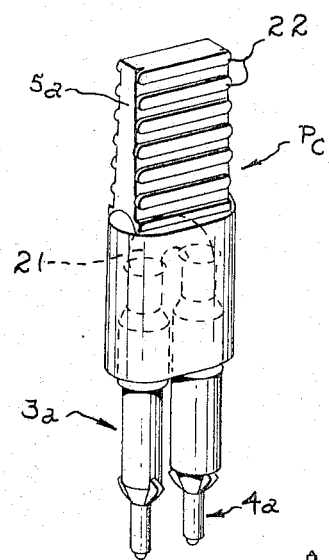
Figure 5:
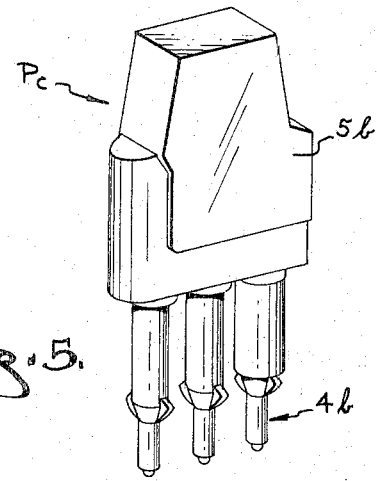
Figure 8:
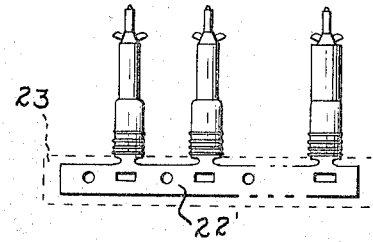
Figure 6:
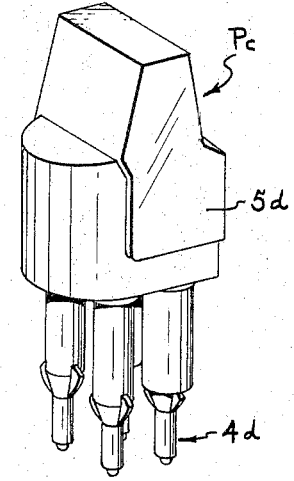

FIGURES 4 and 6, respectively, illustrate patchcords PC having three and five aligned plug members disposed in boots 5b and 5c with one plug member defining a polarized plug member 4b and 4c. FIGURE 5 shows a patchcord PC wherein two rows of plug members are disposed in boot 5d and plug member 4d is the polarized plug member.

Each of the embodiments of FIGURES 4–6 are similar in configuration to that of FIGURE 3 and each plug member may be electrically connected to one or all of the plug members or in any other desirable manner. Also, the polarizing plug member need not be connected to any of the other plug members but used only for polarizing purposes. Alternatively, each of these patchcords may be interconnected to a corresponding patchcord in the manner of the patchcords of FIGURE 1.

Figure 7:
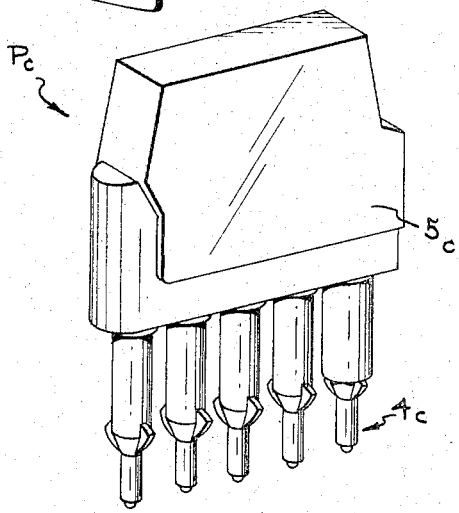

Patchcord PC of FIGURE 7 is similar to the embodiment of FIGURE 6 except that in FIGURE 7 each of the plug members is interconnected by carrier strip 22′ which is the strip formed during the stamping operation to form the sleeve, wire barrel portion, nose portion and frustoconical portion of the plug members. Nose member 16 and spring 12 are placed in each plug member to form a completed plug member, and carrier strip 22′ serves to common the plug members without having to use wire for interconnection purposes. Naturally, the distance between centers of the plug members corresponds to the distance between centers of the apertures of plugboard PB. A polarizing plug member 4c may also be provided on this patchcord. A covering 23 of flexible plastic material is disposed over carrier strip 22′ up to the circumferential ridges of the plug members.

The carrier strip and flexible plastic boot of FIGURE 7 allow this patchcord to be placed in a variety of configurations, such as, a U-shape, W-shape, etc., within the plugboard so as to common these apertures.

While there has been disclosed a number of patchcords with different numbers of plug members and arrangement thereof, it is obvious that any desired number and arrangement of plug members in each patchcord may be obtained. It is desirable that the one plug member for polarizing purposes be a semipermanent plug member in order to retain the tubular member thereon. The tubular member can be of any suitable material, such as, for example, insulating material or metallic material, and it has been found that aluminum is a suitable inexpensive material. While latch sections have been disclosed as being present on each plug member of a patchcord assembly, it is obvious that they need not be present on every plug member, but it is desirable that latch sections be present on the polarizing plug member and at least one more where more than two plug members are present. Of course, where only two plug members are present, it is essential that both be provided with latch sections.

Instead of the tubular member fitting between ridge 9 and latch sections 13, the inner surface of the tubular member could be provided with a circumferential groove in which the latch sections will be disposed upon application of the tubular member onto the plug member. Alternatively, slots or holes may be provided in the tubular member which are spaced inwardly from one end thereof and in alignment with the latch sections. Other variations can certainly be visualized, but enumeration thereof would merely burden the instant description.

As can be discerned, there has been disclosed a novel and simple polarizing means for use on existing plug members of patchcords and which are readily removable to allow the plug member to be used in an aperture of the plugboard consonant with the other plug members of the patchcord.

It will, therefore, be appreciated that the aforementioned and other desirable objects have been achieved; however, it should be emphasized that the particular embodiments of the invention, which are shown and described herein, are intended as merely illustrative and not as restrictive of the invention.

I claim:

1. A patchcord assembly for engagement with openings in a plugboard comprising a plurality of plug members, each of the plug members including a sleeve having a support portion and a contact portion, latch means extending outwardly from an exterior surface of said sleeve and being movable toward and away from a longitudinal axis of said sleeve by a force acting substantially normal with respect to said longitudinal axis, stop means on said sleeve spaced from said latch means, and means extending along said exterior surface of said sleeve of at least one of said plurality of plug members between said latch means and said stop means and being maintained thereon by said latch means, said means interfering with openings of a configuration to receive at least the other of said plurality of plug members thereby defining a polarized patchcord assembly.

2. A patchcord assembly according to claim 1 wherein wire means interconnect said plug members with respective plug members of another patchcord assembly.

3. A patchcord assembly according to claim 1 wherein at least some of said plug members are interconnected.

4. A patchcord assembly according to claim 1 wherein coinductive means interconnect all of the plug members.

5. A patchcord assembly according to claim 1 wherein said means extending along the exterior surface of said sleeve comprises sleeve means.

6. A patchcord assembly for engagement with openings in a plugboard comprising a plurality of plug members, each of said plug members having a sleeve including a support section and a contact section, said sleeve having an opening proximate one end of said sleeve, latching means in said sleeve having a cantilevered arm extending along an interior surface of said sleeve, said cantilevered arm carrying a latching member with said latching member being biased radially by said arm causing said latching member to protrude through said opening beyond an exterior surface of said sleeve and being movable toward and away from a longitudinal axis of said sleeve by a force acting substantially normal with respect to said longitudinal axis, stop means on said sleeve spaced from said opening, the latching means in at least one of said plug members being axially movable, and sleeve means of said one of said plug members between said latching member and said stop means, said sleeve means interfering with openings of a configuration to receive at least the other of said plurality of plug members and being maintained thereon by said latching member thereby defining a polarized patchcord assembly.

7. A patchcord assembly for engagement with openings in a plugboard comprising a plurality of plug members, each of said plug members having a sleeve including a support section and a contact section, said sleeve having an opening proximate one end of said sleeve, latching means in said sleeve having a cantilevered arm extending along an interior surface of said sleeve, said cantilevered arm carrying a latching member with said latching member being biased radially by said arm causing said latching member to protrude through said opening beyond an exterior surface of said sleeve and being movable toward and away from a longitudial axis of said sleeve by a force acting substantially normal with respect to said longitudinal axis, stop means on said sleeve spaced from said opening, the latching means in at least one of said plug members being secured in said sleeve, and sleeve means on said one of said plug members between said latching member and said stop means, said sleeve means interfering with openings of a configuration to receive at least the other of said plurality of plug members and being maintained thereon by said latching member thereby defining a polarized patchcord assembly.

References Cited

UNITED STATES PATENTS

| | | | |
|---|---|---|---|
| 2,427,297 | 9/1947 | Modrey | 339—75 |
| 2,994,849 | 8/1961 | Mussari | 339—184 XR |
| 3,134,633 | 5/1964 | Hatfield | 339—217 |
| 3,144,292 | 8/1964 | Forney | 339—128 |

MARVIN A. CHAMPION, *Primary Examiner.*

PATRICK A. CLIFFORD, *Examiner.*